United States Patent [19]
Wu

[11] Patent Number: 6,157,713
[45] Date of Patent: Dec. 5, 2000

[54] TELEPHONE HOLD CIRCUIT

[75] Inventor: Chyi-Chang Wu, Hsinchu, Taiwan

[73] Assignee: Industrial Technology Research Institute, Taiwan

[21] Appl. No.: 09/075,863

[22] Filed: May 12, 1998

Related U.S. Application Data

[63] Continuation-in-part of application No. 08/631,304, Apr. 10, 1996, abandoned.

[51] Int. Cl.[7] .................................................. H04M 1/00
[52] U.S. Cl. ............................................................ 379/393
[58] Field of Search ................................... 379/393, 162, 379/163, 368

[56] References Cited

U.S. PATENT DOCUMENTS

| | | | |
|---|---|---|---|
| 4,365,117 | 12/1982 | Curtis | 379/393 |
| 4,394,543 | 7/1983 | Keiper, Jr. et al. | 379/393 |
| 4,419,543 | 12/1983 | Kelm et al. | 379/393 |
| 4,440,981 | 4/1984 | Grantland et al. | 379/393 |
| 4,529,843 | 7/1985 | Boeckmann | 379/393 |
| 5,285,495 | 2/1994 | Wu et al. | 379/393 |

*Primary Examiner*—Stella Woo
*Attorney, Agent, or Firm*—Pillsbury Madison & Sutro LLP

[57] ABSTRACT

A hold circuit arrangement for a telephone, wherein the telephone is coupled to an extension release circuit of an external telephone, the hold circuit comprising an input control terminal; a tri-state input device used for generating a signal for the input control terminal; a power supply used for providing a high impedance level for the input control terminal; a hold button circuit used for allowing a hold button of the telephone to convert a status of the hold circuit through the tri-state input device after the hold function is activated regardless of whether the telephone is off-hook or on-hook; and a detecting circuit used for alternately providing a high impedance high level signal or a high impedance low level signal to detect the status of the tri-state input device when the hold function of the telephone is activated, and deciding whether the telephone is hold or not, and signaling the power supply to stop providing the high impedance level signal to the input control terminal when the hold function of the telephone is activated.

6 Claims, 6 Drawing Sheets

TELEPHONE HOLD CIRCUIT

CROSS-REFERENCE TO RELATED APPLICATION

This application is a continuation in part of the application Ser. No. 08/631,304 filed Apr. 10, 1996 abandoned. All of these applications are incorporated herein by this reference.

BACKGROUND OF THE INVENTION

1. Field of the Invention

The present invention relates to a telephone hold circuit, and more particularly to a telephone hold circuit manufactured in a dialer integrated circuit.

2. Description of Related Art

As the number of telephones in each household increases, so does the need to provide each telephone with its own telephone hold circuit. There are some known general arrangements that can be used to provide a telephone with hold function.

Figure 1:
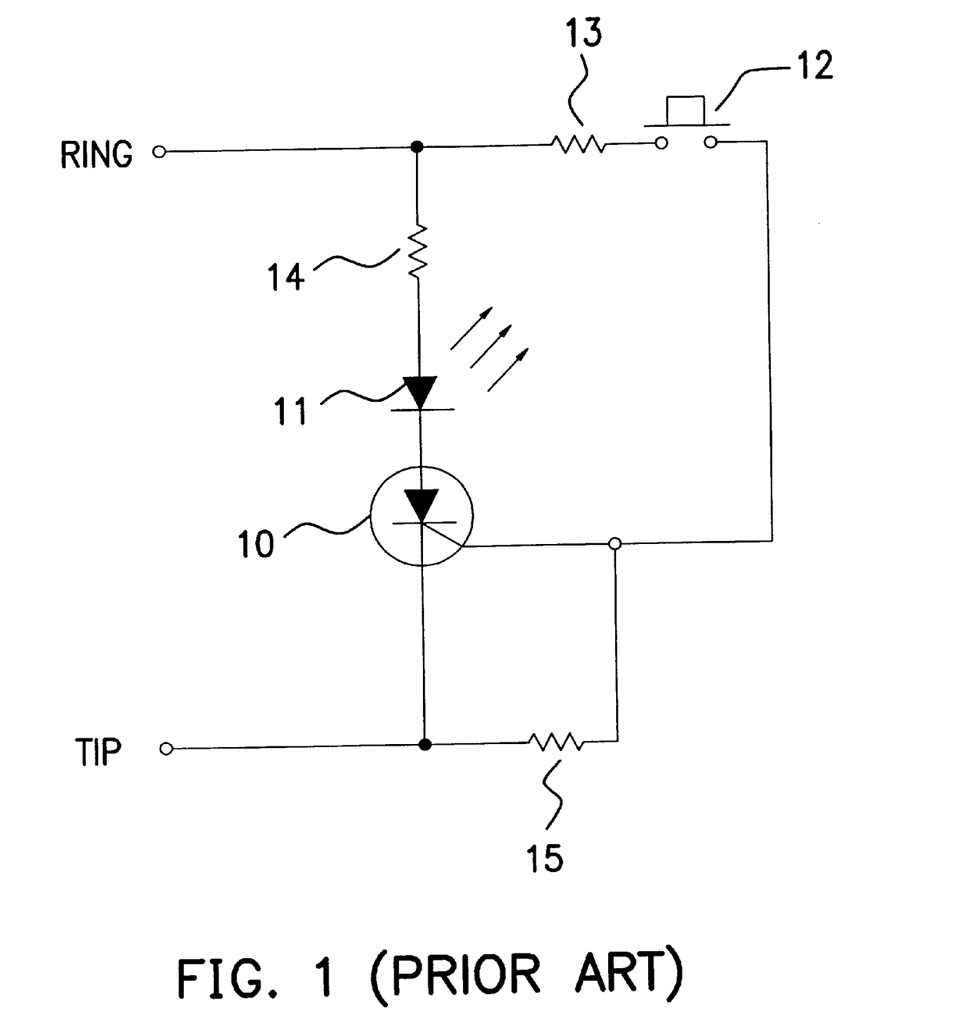
FIG. 1 (Prior Art) schematically illustrates a circuit diagram of a conventional telephone hold circuit.

According to a first such arrangement, a separate telephone hold circuit is connected to the telephone's telephone dialer integrated circuit (IC). Referring to FIG. 1, this kind of telephone hold circuit includes a low-power silicon controlled rectifier (SCR) 10, a light-emitting diode (LED) 11, a hold button 12 and a plurality of resistors 13 to 15. Under normal condition, the SCR 10 is electrically open-circuit, so the hold circuit is not active and the light-emitting diode 11 is dark since no current flows therethrough. As soon as the hold button is depressed, the ringing voltage is conducted to the gate of the SCR 10 to activate the SCR 10. Then, the SCR 10 conducts current and the light-emitted diode 11 lights. The ringing voltage is also sent to the tip wire through the conductive SCR 10. Therefore, a call can be placed on hold even if the handset is on-hook after depressing the hold button.

However, this approach increases the number of components required and hence the complexity and cost of the telephone. Further, it is difficult to set up the telephone hold circuit since the values of the resistors have to be carefully selected so as to prevent malfunction due to interference of noises on the telephone line.

According to a second arrangement, the telephone hold circuit is incorporated into the telephone dialer IC. This approach increases the size of the telephone dialer IC because two additional pins (a tri-state input device and a hold function pin) are required. Moreover, the hold function input signal employed in the second arrangement is not derived from the button keypad of the telephone, and thus does not undergo a de-bouncing process to obviate any erroneous signal. Therefore, erroneous signals may cause the telephone to go on hold or off hold when not intended.

Figure 2A:
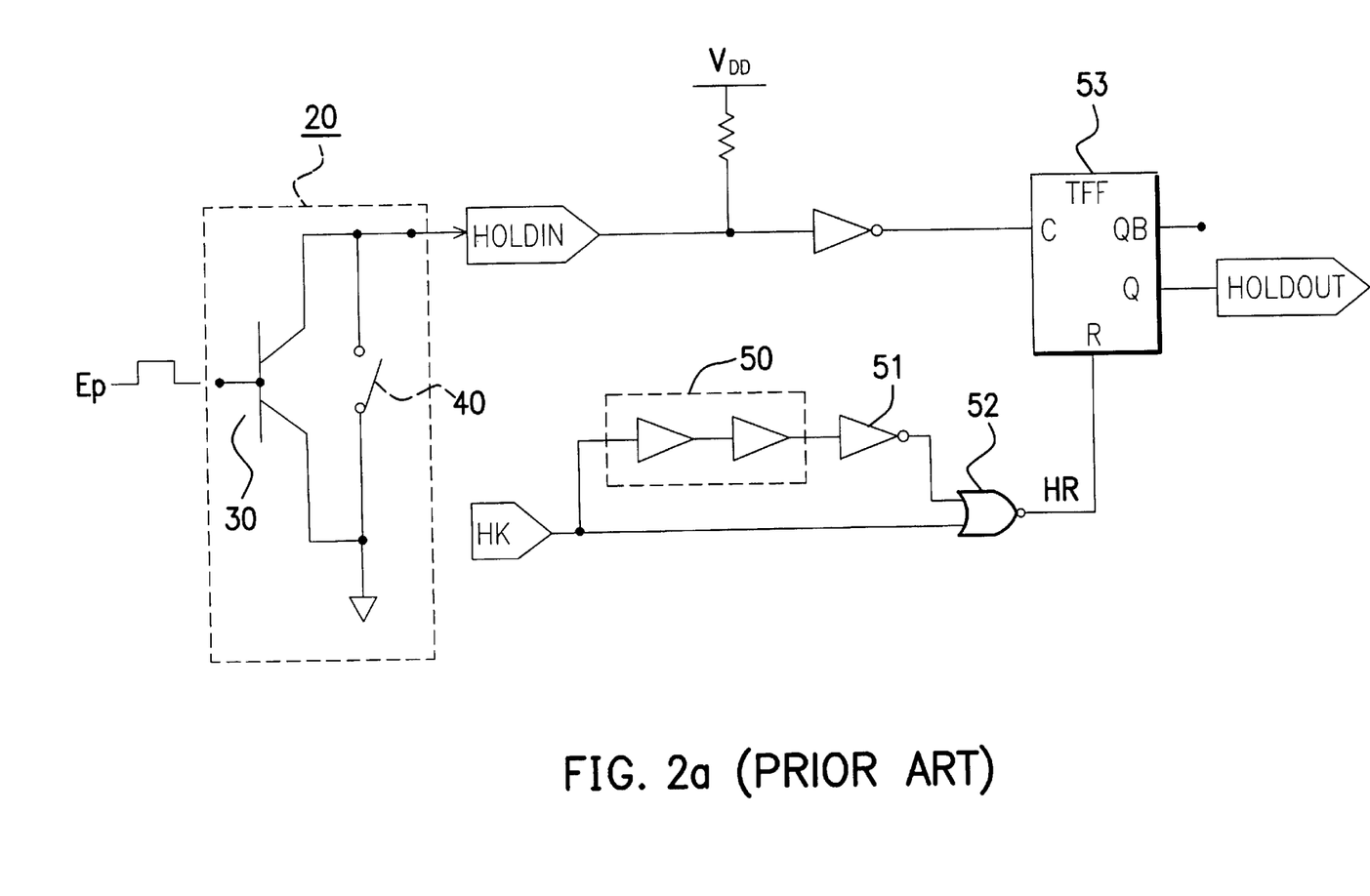
FIG. 2a (Prior Art) schematically illustrates a circuit diagram of telephone hold circuit of a typical dialer IC.

The hold circuit of a typical dialer IC is illustrated in FIG. 2a. An external circuit 20 having a transistor 30 and a switch 40 is coupled to the hold circuit. The switch 40 is mounted on the telephone panel (not shown) to serve as a hold button. The input port labeled HK is used to input the off-hook state or on-hook state of the telephone handset. The state of HK is logical "0" while the handset is in the off-hook state, that is, the handset is picked up. The state of HK is logical "1" when the handset is in the on-hook state, that is, the handset is put down.

Figure 2B:
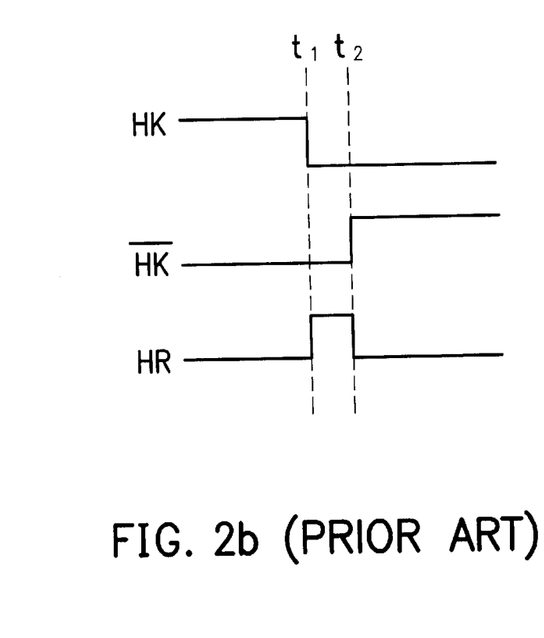

The output signal HR of the NOR gate 52 will be a pulse signal when the handset is in the off-hook state because the signal HR is obtained by the logical NOR operation of the HK signal and an inverted and delayed HK signal obtained by passing the HK signal through a delay circuit 50 and an inverter 51. As shown in FIG. 2b, when the handset is being picked up at time t1, the state of HK is changed from logical "1" to logical "0". Because of the logical NOR operation of the HK signal and an inverted and delayed HK signal obtained by passing the HK signal through a delay circuit 50 and an inverter 51, the signal HR is a pulse during the period from time t1 to time t2.

The output signal HR outputted from NOR gate 52 is used to convert the hold status. Therefore, the hold output HOLD-OUT is a logical "0" when a pulse signal inputs to the flip-flop 53. Whenever the hold button is depressed, the hold status changes once. In addition, when the extension handset is picked up, it converts the hold status by a low level pulse generated by the emitter of the transistor 30 due to a variation of the voltage pulse Ep from the telephone line.

The above-described arrangement, however, has the following drawbacks. First, a variation of the voltage Ep from the telephone line is used to release the hold status, which may also result in a mistaken change of status of the telephone from non-hold to hold status. Secondly, since the characteristics of the noise produced by the telephone line and the bouncing noise produced by the push button mechanism while the push buttons are depressed are different, simply adding a capacitor on the port HOLDIN which is employed to input the telephone hold signal cannot completely eliminate the above two kinds of noise. Therefore, the telephone hold function will not be stable.

SUMMARY OF THE INVENTION

It is therefore an object of the present invention to provide an improved telephone hold arrangement that overcomes the drawbacks and disadvantages associated with the aforementioned telephone hold circuit.

It is another object of the present invention to provide a telephone dialer IC which has a built-in telephone hold circuit incorporating a de-bouncing circuit to prevent the untimely entry and release of the telephone from the hold state because of the presence of erroneous signals.

Still another object of the present invention is to manufacture a telephone hold circuit in a telephone dialer IC with fewer IC pins than is possible using conventional arrangements.

Accordingly, the present invention provides a new telephone hold arrangement. The telephone hold circuit is controlled by a tri-state input device which respectively inputs a signal representing a hold status, a release status, and a floating state. The telephone hold circuit does not provide any voltage to the tri-state input device, and the status of the tri-state input device will not affect the telephone hold circuit.

That is, the hold button is inactive while the telephone is on-hook. As soon as the telephone is off-hook, a power supply will provide a high impedance level to the tri-state input device. At this time, an extension release signal, i.e., a low level pulse signal can not affect the tri-state input device and the noises on the telephone line won't affect the status of the tri-state input device, but the hold button is active. Thus, the telephone can be placed in on-hold status as the hold button is depressed.

Once the telephone is on hold, the hold circuit alternately provides high impedance high level signals and high impedance low level signals to the tri-state input device. Then, both of the hold button release function and the extension release function, i.e., to release the telephone from hold status by picking up the handset of an extension, are active.

However, the time needed for removing the bouncing noise and removing the extension release noise is different. Generally speaking, the time for removing the bouncing noise is about 20 ms and the time for removing the extension release noise is about 290 ms.

Accordingly, it is an aspect of this invention that after the telephone is off-hook or the circuit is on line, the hold function is activated. Then, both the hold button and the extension release signal can be used to release the hold status regardless of whether or not the telephone is on-hook. This makes the use of the hold function of the telephone easier than that of the prior art.

It is another aspect of the present invention that the hold function is stable because the noise produced by the extension release operation and the bouncing noise are processed separately. In other words, since the time needed to eliminate these two different kinds of noises is different, the noises are substantially eliminated by processing separately. Thus, the hold function of the telephone is much more stable since there is no significant interference within the telephone line by noises.

Other objects, features and advantages of the present invention will become apparent by way of the following detailed description of the preferred but non-limiting embodiment.

BRIEF DESCRIPTION OF THE DRAWINGS

The following detailed description is not intended to limit the invention solely to the embodiments described herein, and will best be understood in conjunction with the accompanying drawings in which:

FIG. 2b (Prior Art) is the timing diagram of signals shown in FIG. 2a;

In all of the drawings, identical reference numerals represent the same or similar components of the telephone hold circuit utilized for the description of the present invention.

DETAILED DESCRIPTION OF THE PREFERRED EMBODIMENT

Figure 3:
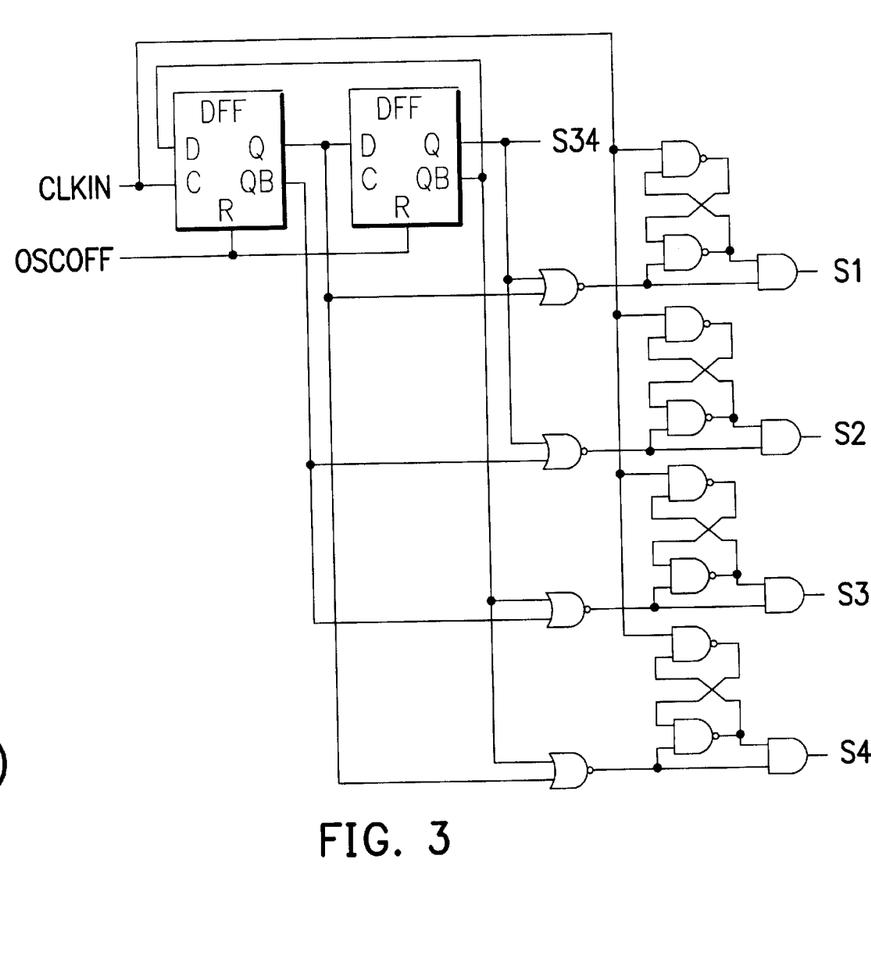
FIG. 3 is a circuit diagram of a timing generator in a dialer IC.
Figure 4:
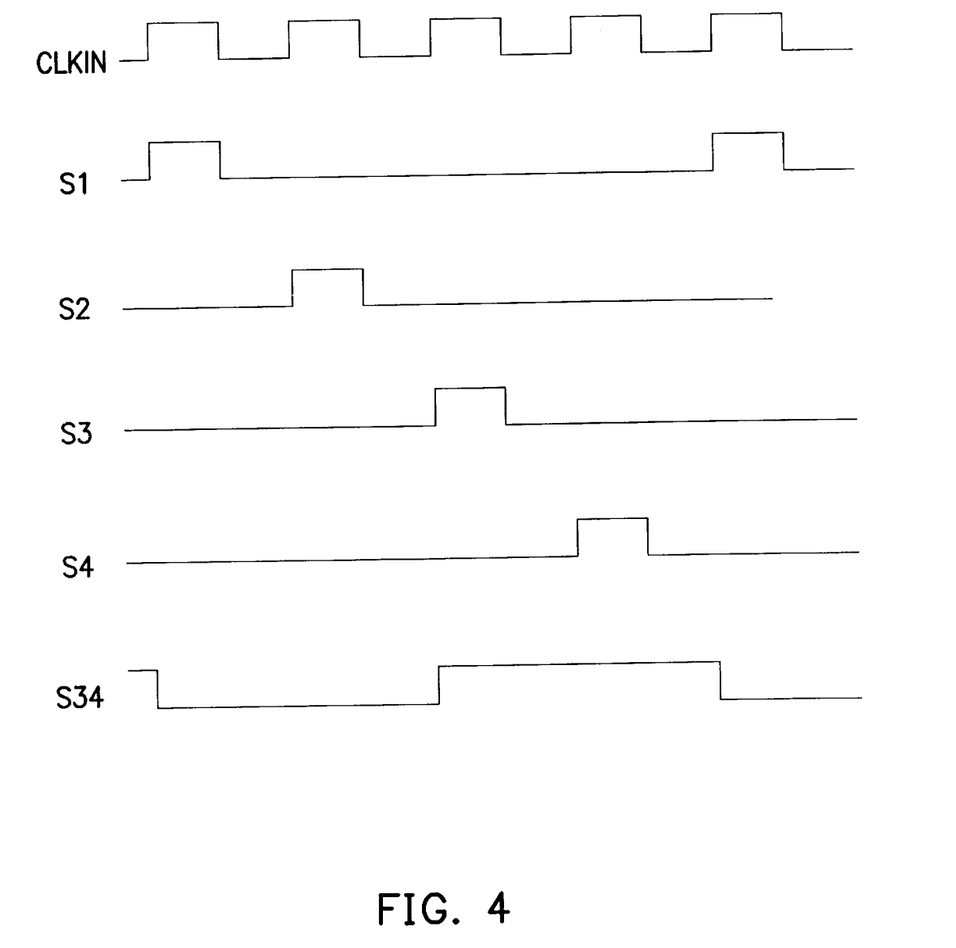
FIG. 4 is the timing diagram generated by the timing generator of FIG. 3.

Referring to FIG. 3, which illustrates a clock generator for generating control clock signals of the telephone circuit. The CLKIN signal is used for controlling normal operation of the telephone circuit. For reducing consumption of the power, an oscillator in the telephone circuit used for generating the CLKIN signal is turned off while the telephone is in a status of standby. The OSCOFF signal is used for resetting related signals while the oscillator is turned off, that is, in the standby status. The timing diagram of the control clock signals S1, S2, S3, S4 and S34 is as shown in FIG. 4.

Figure 5A:
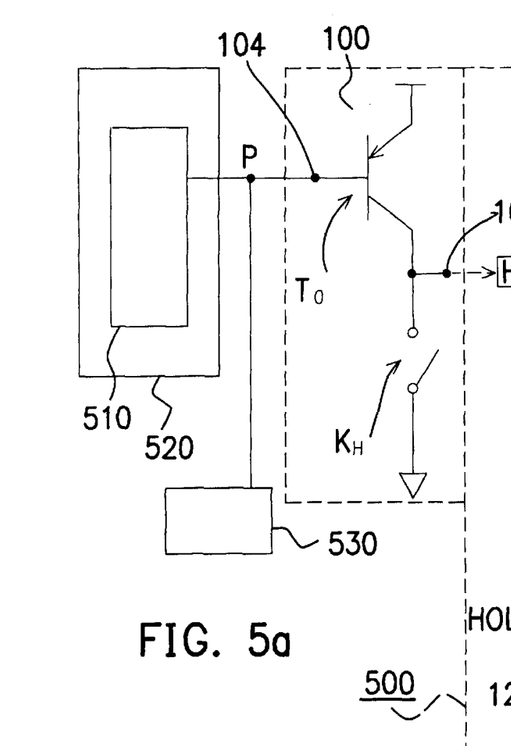
FIG. 5a is a circuit diagram of a tri-state input device.
Figure 5B:
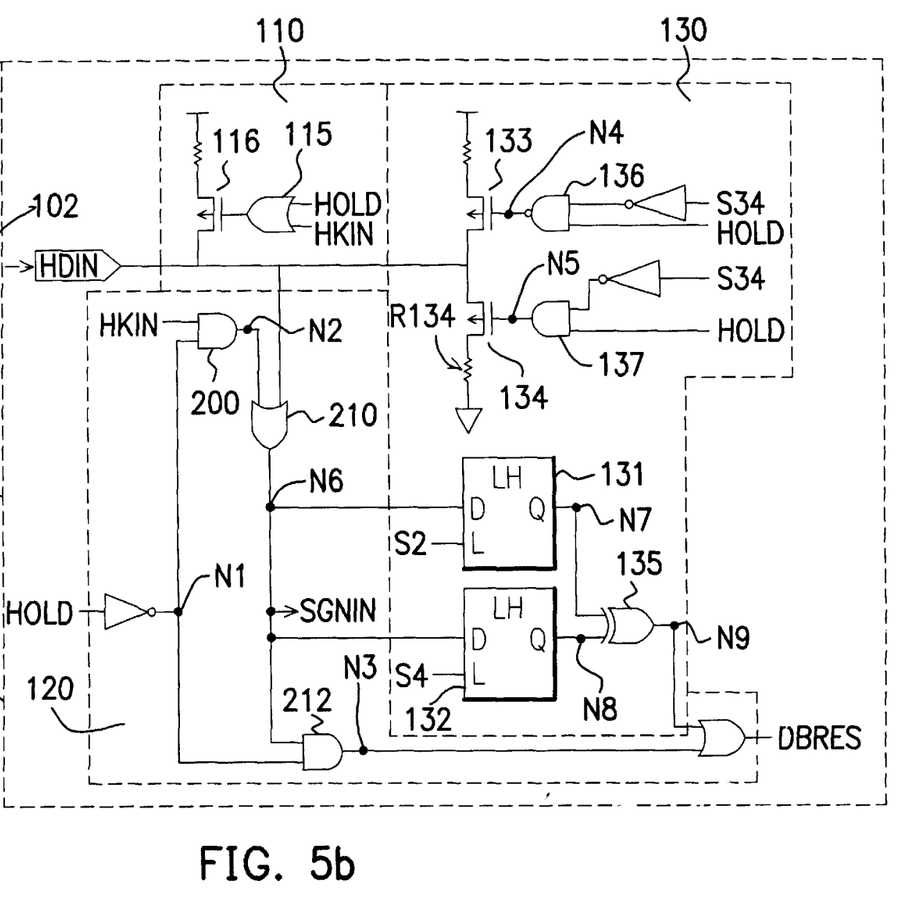
FIG. 5b is a circuit diagram of the input control circuit of telephone hold circuit according to the present invention.
Figure 5C:
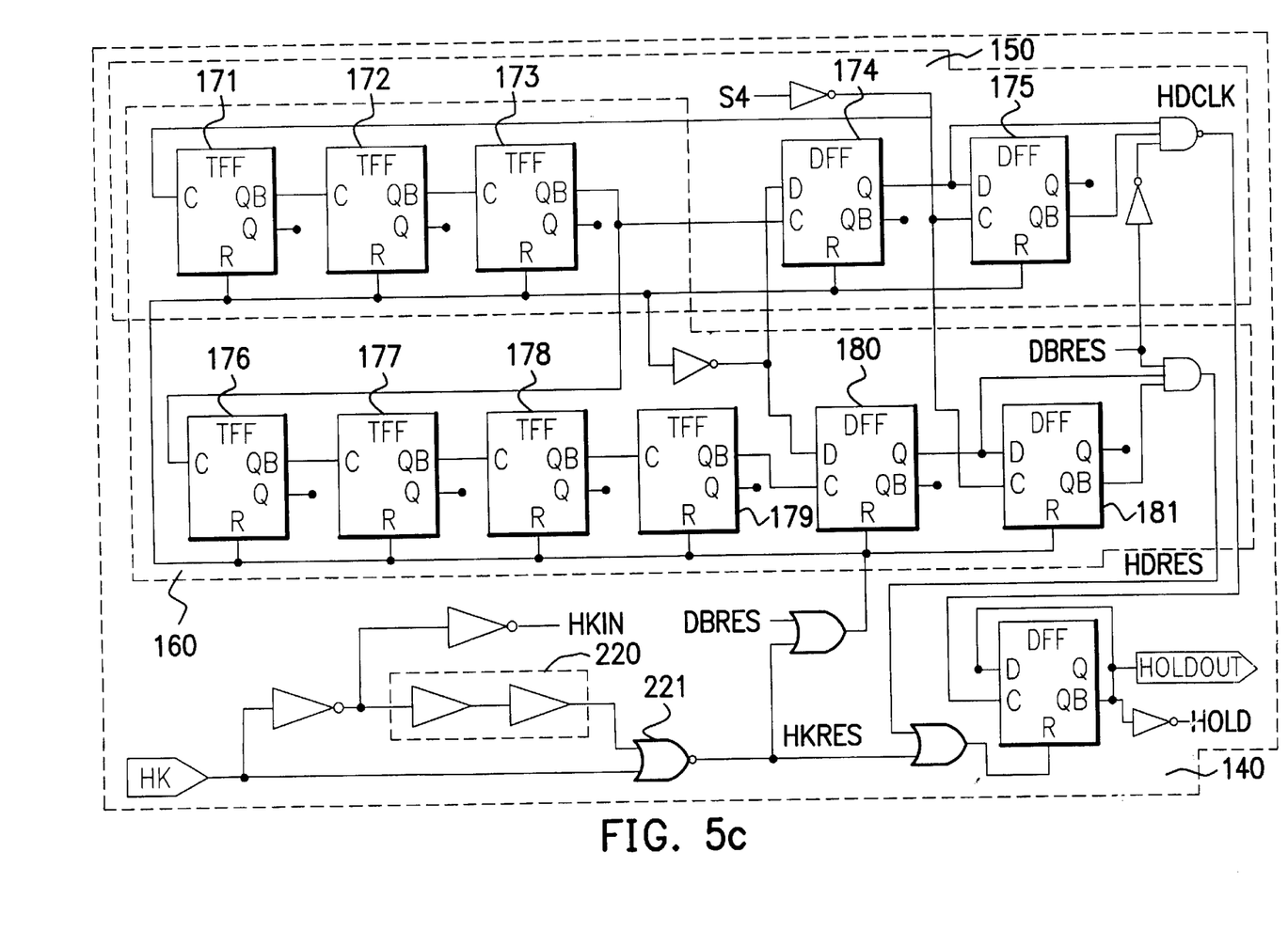
FIG. 5c is a circuit diagram of a noise eliminating circuit incorporated into the telephone hold circuit according to the present invention.

Referring to FIGS. 5a to 5c, a telephone hold circuit of the present invention is arranged for a telephone. The hold circuit comprises a tri-state input device 100, an input control circuit 500 and a noise eliminating circuit 140. The input control circuit 500 includes a high level power supply 110, a hold button circuit 120, a detecting circuit 130. The hold button circuit 120, detecting circuit 130 and noise eliminating circuit 140 can be built in an IC device, for example, a telephone dialer IC. The symbols HDIN, HK and HOLDOUT respectively represent pins of the IC device. The input pin HDIN is coupled to the output signal 102 of the tri-state input device 100.

A tri-state input device 100 is used for outputting a signal 102, which represents a hold status, a release status, or a floating state of the telephone. For example, the tri-state input device 100 comprises a transistor T0 and a switch $K_H$. When the switch $K_H$ is logical "1", i.e., the switch $K_H$ is "ON" or a hold button of the telephone is pushed, the hold function of the telephone is activated. The voltage level of the signal 102 is changed into a ground level. The signal 102 is then representing the hold status.

When the base terminal of the transistor T0 is receives an extension release signal P from another telephone 520, the voltage level of the signal 102 is changed into a high level. The signal 102 is then representing the release status. When the switch $K_H$ is "OFF" and the base terminal of the transistor T0 does not receive the extension release signal P, the signal 102 is then representing the floating status.

The high level power supply 110 is used for providing a high impedance level for the input pin HDIN before the hold function of the telephone is activated. The high impedance level is equal to the impedance level of an extension release circuit 510 of another telephone 520 after one extension handset of the telephone 520 is picked up. Therefore, the extension release signal P from the extension release circuit 510 can release the hold status by the tri-state input device 100 only when the telephone is currently under hold status, i.e., the hold function is activated.

The hold button circuit 120 is used for allowing the hold button of the telephone to convert the hold status through the tri-state input device 100 after the hold function comes into effect regardless of whether the handset is off-hook or on-hook. The detecting circuit 130 is used for alternately providing a high impedance high level signal or a high impedance low level signal for the noise eliminating circuit 140.

The detecting circuit 130 is also used for detecting the status of the tri-state input device 100 when the telephone is hold status. The detecting circuit 130 also can record the status of the tri-state input device 100 by using two memories. The memories respectively determine whether or not the hold function comes into effect. The memories also signal the power supply 110 to stop providing the high impedance high level signal to the tri-state input device 100 when the telephone is held.

The noise eliminating circuit 140 is used for eliminating a bouncing noise while the hold button is pushed and an extension release noise from the extension release circuit 510. The bouncing noise is caused by the mechanism of a push button and is produced while pressing the hold button. The extension release noise is caused by the mechanism of the hook in a telephone set and is produced while picking up an extension telephone being held.

The noise eliminating circuit 140 includes a bouncing noise eliminating circuit 150 and an extension release noise eliminating circuit 160. As shown in FIG. 5c, for reducing the initial cost, the bouncing noise eliminating circuit 150 shares the first three flip-flops 171, 172 and 173 with the extension release noise eliminating circuit 160.

The operation of the telephone hold function of the present invention is described as follows.

The state of the input signal HOLD and the state of the output pin HOLDOUT are both logical "0" (i.e., low level) before the hold function is activated. The state of the input pin HDIN of the IC is floating while the telephone is on-hook, that is, the state of the hook signal HKIN is logical "1". At this time, the node N1 is logical "1" after NOT logical operation of the input signal HOLD. The output of the AND gate 200, i.e., node N2, is logical "1" (i.e., high level) after AND logical operation of the hook signal HKIN and the node N1. The output of the OR gate 210, i.e., node N6, is hence logical "1". The output of the AND gate 212, i.e., node N3 is hence logical "1". The output of the XOR gate 135, i.e., node N9 is stayed in logical "0." The variation of the input pin HDIN does not affect the status of the telephone. The transistor 116 is in logical "OFF", that is, there is no voltage applied to the input pin HDIN.

The OR gate 210 which is preferably fabricated in CMOS technology consumes very little DC current no matter what the voltage of the HDIN pin is. The oscillator (not shown in the drawings) of the IC is also in a turned-off state. Therefore, the whole IC consumes little power under such conditions.

When the handset of the telephone is picked up, that is, the telephone is off-hook, the level of the pin HK connected to the hook is changed from logical "1" to logical "0". The signal HKIN is also changed from logical "1" to logical "0." The hook signal HKRES will appear as a positive pulse signal because the signal HKRES is obtained by the logical NOR operation of the pin HK and is itself inverted and delayed as it passes through a delay circuit 220 and an inverter 221.

The positive pulse signal HKRES can be used to convert the hold status and to reset all of the flip-flops in the noise eliminating circuit 140 so as to reset time counting. At this time, the output of the OR gate 115 in the high level power supply 110 is logical "0" since the levels of the signal HOLD and the signal HKIN are both logical "0".

The signal HKIN is logical "0" and the state of the pin HK is logical "0", as shown in FIG. 5c, because the telephone is off-hook. The PMOS transistor 116 is turned on to supply a high impedance high level signal to the input pin HDIN. The output of the NAND gate 136, i.e., node N4 is logical "1." The output of the AND gate 137, i.e., node N5 is logical "0." Transistor 133 and transistor 134 are respectively "OFF" and "ON." It makes the input pin HDIN stay in a high level and then makes the node N6 remain in logical "1."

Moreover, the level of the signal SGNIN is logical "1" since the state of the input pin HDIN is logical "1" and node N2 is logical "0." The inverted level of the signal HOLD is logical "1", that is, the node N1 is logical "1." Therefore, node N3 is in logical "1", which makes the level of the signal DBRES become logical "1". That means the noise eliminating circuit 140 still remains in a reset status.

In other words, after the telephone is off-hook, the hold status can be changed only by depressing the hold button, i.e., the switch $K_H$ is turned on. When the switch $K_H$ is changed into "ON", the output signal 102 of the tri-state input device 100 is grounded. The state of the input pin HDIN become logical "0", and then the node N6 is changed from logical "1" to logical "0" because the node N2 is originally logical "0". The node N3 is also changed into logical "0" by logical NAND operation of the node N1 and node N6.

Because the pulse S2 shown in FIG. 4 comes sooner than the pulse S4, output node N7 of the latch 131 is changed from logical "1" to logical "0", and then output node N8 of the latch 132 is sequentially changed from logical "1" to logical "0." The difference makes the node N9 be a pulse, which makes the signal DBRES be a pulse. After a bounce time (a delay time caused by transmitting through flip-flops 171, 172, 173,174 and 175 in the bouncing noise eliminating circuit 150), the state of the signal HOLD and the output pin HOLDOUT are changed from logical "0" to logical "1." The status of the telephone is changed into the hold status.

When the telephone stays in the hold status, the signal HOLD is logical "1", which makes the transistor 116 off. There is no voltage applied to the input pins HDIN. The nodes N1, N2 and N3 are all logical "0." In such situation, there are three states for the telephone, which are the floating status, the ground status and the release status.

In the floating status, the switch $K_H$ is "OFF" and the base terminal of the transistor T0 does not receive the extension release signal P. Referring to FIG. 4, when the signal S2 is changed from logical "0" to logical "1", the signal S34 is still logical "0." At that time, the node N4 is changed to logical "0" and the node N5 is changed to logical "1." Therefore, the transistor 133 is logical "ON" and the transistor 134 is logical "OFF". The input pin HDIN is changed to a high voltage level.

Referring to FIG. 4, when the signal S4 is changed from logical "0" to logical "1", the signal S34 is also changed from logical "0" to logical "0". At that time, the node N4 is changed to logical "1" and the node N5 is changed to logical "0." Therefore, the transistor 133 is logical "OFF" and the transistor 134 is logical "ON". The input pin HDIN is changed to a low voltage level.

The voltage level of the input pin HDIN is interchangeably either a high voltage level or a low voltage level.

In the ground status, the switch $K_H$ is "ON" and the base terminal of the transistor T0 does not receive the extension release signal P. The input HDIN is grounded and the node N6 and signal SGNIN are changed to logical "0" because that the node N2 and the HDIN are all logical "0". When the signal S2 is changed from logical "0" to logical "1", the node N7 is changed to logical "0".

After that, the signal S4 is sequentially changed from logical "0" to logical "1", and then the node N8 is changed to logical "0". Therefore, the node N9 is changed to logical "0". Because the signal SGNIN is logical "0", the bouncing noise eliminating circuit 150 is activated. After a delay time caused by transmitting through flip-flops 171, 172, 173,174 and 175 in the bouncing noise eliminating circuit 150, the hold function of the telephone is then released.

In the release status, the switch $K_H$ is "OFF" and the base terminal of the transistor T0 receives the extension release signal P from another telephone. The input HDIN is applied to a high voltage level. The node N6 and signal SGNIN are changed to logical "1" because the HDIN is logical "1". When the signal S2 is changed from logical "0" to logical "1", the node N7 is changed to logical "1".

After that, the signal S4 is sequentially changed from logical "0" to logical "1", and then the node N8 is changed to logical "1". Therefore, the node N9 is changed to logical "1". After a delay time caused by transmitting through flip-flops 171, 172, 173, 177, 178, 179 and 180 in the extension release noise eliminating circuit 160, the hold function of the telephone is then released.

According to the embodiment, the invention provides a telephone dialer IC having a built-in telephone hold circuit incorporating a noise eliminating circuit to prevent the untimely entry and release of the telephone from the hold state because of the presence of erroneous signals. The invention also provides a telephone hold circuit in a telephone dialer IC with fewer IC pins than is possible using conventional arrangements.

Accordingly, the invention provides a new telephone hold arrangement. The telephone hold circuit is controlled by a tri-state input device. The tri-state input device provides a signal representing a hold status, a release status, or a floating status. The telephone hold circuit does not need to provide any voltage to the tri-state input device, and the status of the tri-state input device will not affect the telephone hold circuit.

That is, the hold button is inactive while the telephone is on-hook. As soon as the telephone is off-hook, a power supply will provide a high impedance level to the tri-state input device. At this time, an extension release signal, i.e., a low level pulse signal can not affect the tri-state input device and the noises on the telephone line won't affect the status of the tri-state input device, but the hold button is active. Thus, the telephone can be placed in on-hold status as the hold button is depressed.

Once the telephone is on hold, the hold circuit alternately provides high impedance high level signals and high impedance low level signals to the tri-state input device. Then, both of the hold button release function and the extension release function, i.e., to release the telephone from hold status by picking up the handset of an extension, are active.

Accordingly, it is an aspect of this invention that after the telephone is off-hook or the circuit is on line, the hold function is activated. Then, both the hold button and the extension release signal can be used to release the hold status regardless of whether or not the telephone is on-hook. This makes the use of the hold function of the telephone easier than that of the prior art.

The hold function of the invention is stable because the noise produced by the extension release operation and the bouncing noise are processed separately. In other words, since the time needed to eliminate these two different kinds of noises is different, the bouncing noise the noises are substantially eliminated by processing separately. For example, the bouncing noise is eliminated by the bouncing noise eliminating circuit 150. The noise produced by the extension release operation is eliminated by the extension release noise eliminating circuit 160. Thus, the hold function of the telephone is much more stable since there is no significant interference within the telephone line by noises.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A hold circuit for a telephone coupled to an external telephone, the hold circuit comprising:

an input control terminal;

a tri-state input device, coupled to the input control terminal, configured and arranged to (A) receive an extension release signal from the external telephone and (B) provide a tri-state signal to the input control terminal, said tri-state signal having one among a hold status, a release status, and a floating status;

a power supply, coupled to the input control terminal, configured and arranged to provide a high impedance signal to the input control terminal for preventing the extension release signal from causing said tri-state signal to have the release status;

a hold button circuit, coupled to the input control terminal, configured and arranged to produce a hold activation signal at least in part in response to the hold status and regardless of an on-hook state of the telephone; and a detecting circuit, coupled to the input control terminal and the hold button circuit, configured and arranged to provide a high impedance detection signal at least in part in response to the hold activation signal, said high impedance detection signal having alternating high and low levels, and wherein said tri-state signal has the floating status when said tri-state input device does not receive the extension release signal, and wherein an impedance level of the high impedance signal is substantially equal to an impedance level of the extension release signal, and wherein said power supply is further configured and arranged to stop providing the high impedance signal at least in part in response to said high impedance detection signal.

2. A hold circuit as claimed in claim 1, further comprising a noise eliminating circuit coupled to said power supply, said hold button circuit, and said detecting circuit, wherein said noise eliminating circuit is configured and arranged to eliminate a bouncing noise during an activation of a hold button, and wherein said noise eliminating circuit is configured and arranged to eliminate an extension release noise from the extension release signal.

3. A hold circuit for a telephone as claimed in claim 2, wherein the noise eliminating circuit comprises a bouncing noise eliminating circuit used for eliminating the bouncing noise and an extension release noise eliminating circuit used for the extension release noise.

4. A hold circuit for a telephone as claimed in claim 3, wherein the time of eliminating the bouncing noise is not equal to the time of eliminating the extension release noise.

5. A hold circuit for a telephone as claimed in claim 3, wherein the bouncing noise eliminating circuit shares a plurality of flip-flops with the extension release noise eliminating circuit.

6. A hold circuit for a telephone as claimed in claim 3, wherein the bouncing noise eliminating circuit and the extension release noise eliminating circuit are reset when the handset is picked up.

* * * * *

UNITED STATES PATENT AND TRADEMARK OFFICE
CERTIFICATE OF CORRECTION

PATENT NO.    : 6,157,713
DATED         : December 5, 2000
INVENTOR(S)   : Wu It is certified that error appears in the above-identified patent and that said Letters Patent is hereby corrected as shown below:

<u>Title page,</u>
Change Item "[73] Assignee:  Industrial Technology Research Institute, Taiwan" to
-- [73]  Assignee:  United Microelectronics Corporation --

Signed and Sealed this

Sixteenth Day of March, 2004

JON W. DUDAS
*Acting Director of the United States Patent and Trademark Office*